No. 787,956. PATENTED APR. 25, 1905.
J. A. STONE.
BEVEL GEARING.
APPLICATION FILED SEPT. 19, 1903.

No. 787,956. Patented April 25, 1905.

UNITED STATES PATENT OFFICE.

JOHN A. STONE, OF CHICAGO, ILLINOIS.

BEVEL-GEARING.

SPECIFICATION forming part of Letters Patent No. 787,956, dated April 25, 1905.

Application filed September 19, 1903. Serial No. 173,784.

*To all whom it may concern:*

Be it known that I, JOHN A. STONE, a citizen of the United States, residing at Chicago, in the county of Cook and State of Illinois, have invented a new and useful Improvement in Bevel-Gearing, of which the following is a complete description.

This invention relates to means for intermittently varying the speed of a driven gear, so that a portion of the revolution thereof may be above or below the normal speed, thus hastening or retarding the movement of one or more of the affected elements of the machine to which such improved gear is applied.

That bevel-gears with intermittent or varying movement have heretofore been used is conceded, and no claims are made to such; but what is claimed as new and what is stated to be the purpose of this invention is to furnish a set or sets of several teeth intermediate in pitch and position of the inner and outer or fast and slow segments in order to facilitate the transition from one extreme of velocity to the other.

The invention applies to bevel-gearing, and, in effect, consists in increasing the pitch of the teeth as they approach the apex of the pitch-cones and decreasing the number of teeth on one member—say the gear—without changing the number of teeth on the pinion To accomplish this, it is obvious that while the teeth may be continuous on the pinion they cannot be so on the gear, because of the change in number, and hence from necessity, as well as from economy, teeth are provided on only alternate portions or segments of the pitch-surface thereof. The mesh of the teeth between the driving-pinion and driven gear is theoretically correct except in passing from one step to the next adjacent, and by virtue of these intervening steps or series of steps between the inner and outer segments the mesh at these transition points can be made to approximate very closely to the correct form, and thus the change in velocity rendered less sudden and the consequent shock reduced.

Figure 1:
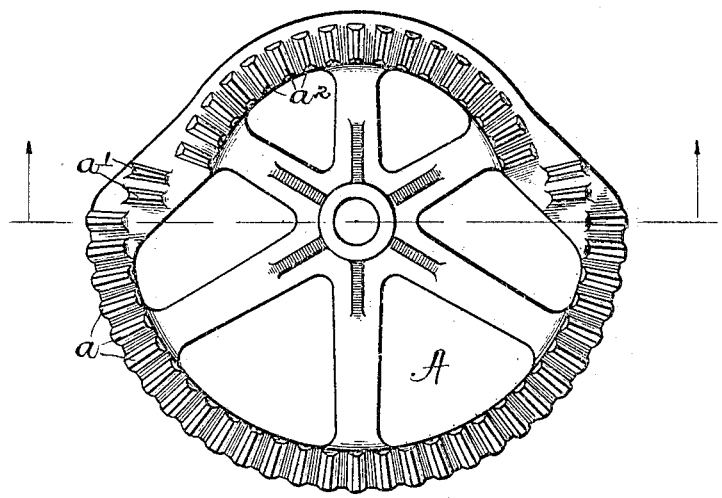
Figure 2:
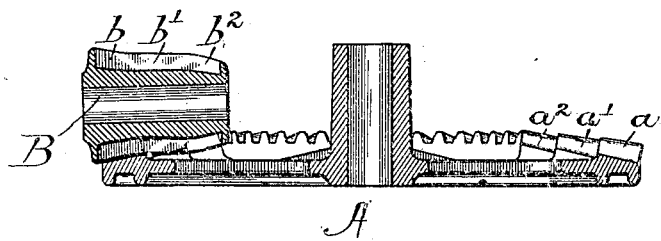

Referring to the drawings, Figure 1 is a plan view of a gear, illustrating my improvement. Fig. 2 is a sectional elevation of same, showing the pinion in mesh therewith; and Fig. 3 is a similar view showing the extent of the departure of the teeth from the correct form.

In connection with the above figures, A represents the gear, and B the pinion. $a$ and $a^2$ designate the outer and inner tooth-segments on the gear, and $a'$ the intermediate or transition segments therebetween, while $b$, $b'$, and $b^2$ designate sections on the pinion B corresponding in pitch and position with the segments $a$, $a'$, and $a^2$, respectively.

Figure 3:
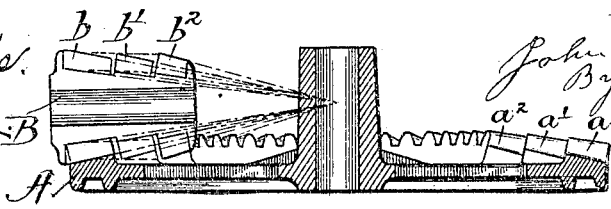

Instead of the teeth of the inner segment $a^2$ of the gear A being of a size normally governed and determined by the pitch and taper of the teeth in the outer segment $a$ they are arbitrarily made larger, and hence of a greater angular pitch, as indicated in Fig. 3. The diameter of the lower sections of the pinion B is increased an amount sufficient to bring the pitch of the teeth to correspond to the increased pitch of the teeth of the inner segments $a'$ and $a^2$ of the gear. To make the outline of the teeth of the pinion uniform, the offsets that occur at junction of the several sections thereof are filled in and trimmed off, as shown in Figs. 2 and 3, the dotted lines in Fig. 3 indicating the original form and the full lines in Fig. 2 the final form. Since the continuity of the teeth of the gear is broken by their decreased number on the inner segments, no such modification from their correct form could be made, nor is it necessary, because the teeth of the several segments cover alternate portions of the pitch-surface of what may be regarded as the pitch-cone of the gears.

Following the above plan, the gear is made with the three segments $a$, $a'$, and $a^2$, all lying in the surface of the same pitch-cone, as illustrated in Fig. 3, the segment $a$, constructed as of a bevel-gear having fifty-six teeth and a pitch of .698 of an inch, while the segment $a'$ is constructed as of a bevel-gear having fifty teeth and a pitch of .658 of an inch and the segment $a^2$ as of a bevel-gear having forty-two teeth and a pitch of .635 of an inch. The velocity ratio, therefore, between the inner and outer segments in this instance would be as fifty-six to forty-two. The pinion B may be regarded as having ten teeth, and the pitch of the sections $b$, $b'$, and $b^2$ correspond, respectively, with the pitch of the segments $a$, $a'$, and $a^2$, respectively, the sections $b$, $b'$, and $b^2$ being arranged longitudinally coincident.

While a comparatively small change in velocity ratio has been provided for in this instance and only one step has been shown, I do not limit myself to one intermediate segment, for a greater number could be used, resulting in a greater change in velocity ratio, and yet be within the scope of this improvement.

What I claim as my invention, and desire to secure by Letters Patent, is—

1. In a pair of driving-gears, the combination of a bevel-gear having inner and outer segments of teeth with different angular pitch, the said segments being located at different radial distances from the common apex of their pitch-cones, intermediate segments or steps between the said inner and outer segments, and a pinion having the several sections of its teeth uniform in number and longitudinally coincident, but of a pitch to correspond respectively with the pitch of the teeth of the several segments.

2. In a pair of gears, the combination of a bevel-gear having an inner and an outer segment of different radial distances from the common apex of their cones and intermediate steps or segments between the said outer and inner segments, and a bevel-pinion of uniform number of teeth throughout its length, said teeth arranged longitudinally coincident, but having a portion of their length made to correspond in pitch and length of face with the segments of said gear.

JOHN A. STONE.

Witnesses:
JAMES C. BECK,
EDGAR L. KEENER.